Feb. 10, 1942.  A. F. SANDERS  2,272,726
CONTROL OF FUEL INJECTION ENGINES
Filed Feb. 12, 1941  3 Sheets-Sheet 1

Inventor
Arthur F. Sanders
by Mawhinney & Mawhinney
Attorneys.

Inventor
Arthur F. Sanders
by Mawhinney & Mawhinney
Attorneys.

Patented Feb. 10, 1942

2,272,726

UNITED STATES PATENT OFFICE 2,272,726

CONTROL OF FUEL INJECTION ENGINES

Arthur Freeman Sanders, Leeds, England, assignor of one-half to John Fowler & Co. (Leeds) Limited, Leeds, England Application February 12, 1941, Serial No. 378,668
In Great Britain December 11, 1939

8 Claims. (Cl. 123—140)

This invention relates to fuel-injection engines, and more particularly to compression-ignition engines of the kind having airless-fuel-injection and provided with a speed-responsive governor for controlling the instant at which injection begins (hereinafter referred to as the moment of injection) whereby injection will take place later at low engine speeds than at higher engine speeds.

One object is to provide improvements in the running of a fuel-injection engine when the latter is cold at starting.

A further object is to provide automatic means for advancing the moment of injection when the engine is cold at starting, and thereafter for retarding it, or allowing it to be retarded, progressively to the normal timing as the engine temperature increases. In general it is desirable that the moment of injection, when the engine is cold, should be advanced to a point such as that normally used with the engine, when fitted with a speed-responsive governor as aforesaid, running at approximately two-thirds up to normal full speed.

A further object consists in providing a fuel-injection engine having a speed-responsive governor as aforesaid, with manual or automatic means for varying the governor action whereby, when the engine is cold, the moment of injection can be made to be, or will be, earlier than when normal temperatures have been reached for a given engine speed.

A still further object is to improve the idling properties of an engine provided with such a governor.

Various arrangements according to the invention will now be described, by way of example, in connection with the accompanying sheets of drawings in which.

Figure 1:
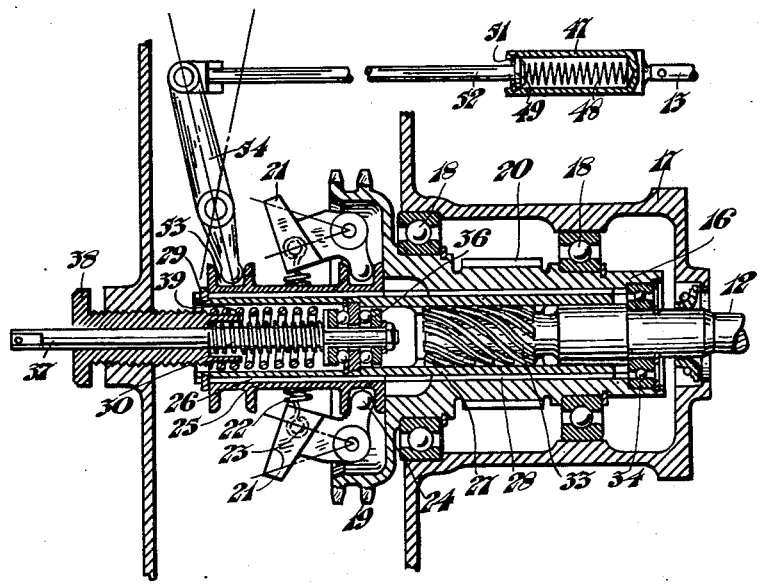
Figure 1 is mainly a sectional elevation through a speed-responsive governor, according to the invention, shown in the "fuel off" position and when the engine is hot.
Figure 3:
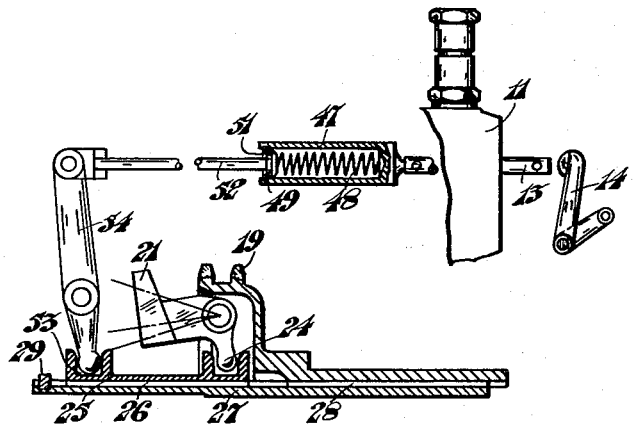
Figure 4:
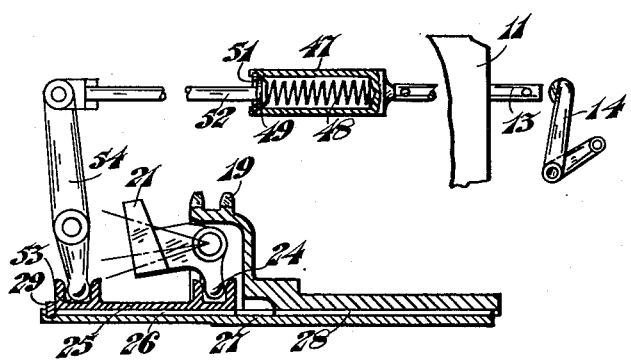
Figure 5:
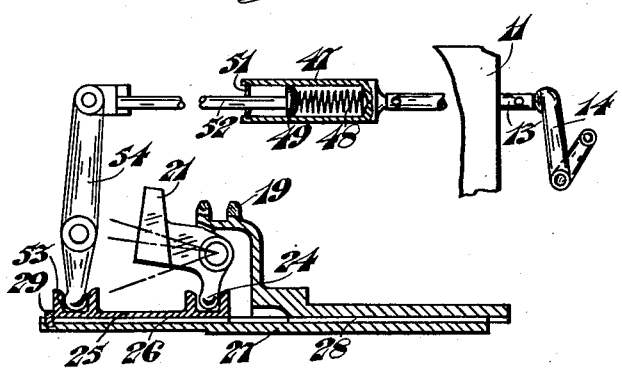
Figure 6:
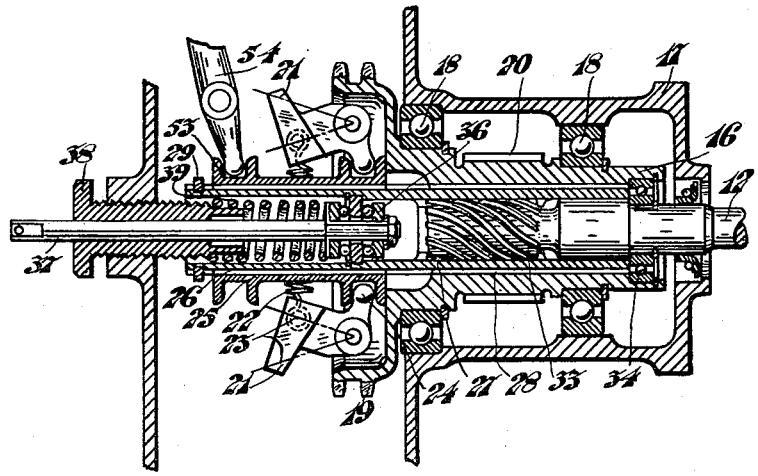
Figure 7:
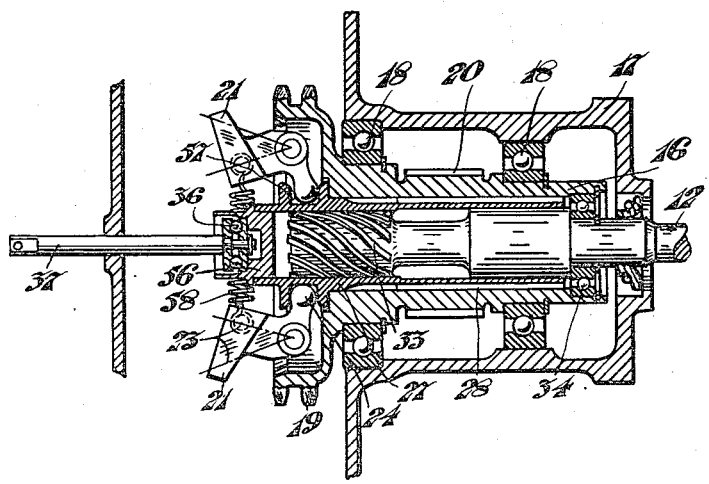

Figures 3 to 5 are diagrams indicating the operation of the construction of Figure 1: Figure 3 showing the parts when the engine is cold and the moment of injection is in consequence automatically advanced, the main control being in the idling position; Figure 4 showing the parts when the engine is warm and the main control is in the idling position; and Figure 5 shows the parts when the engine is warm and the main control is well opened;

Figure 6 is a fragmentary view of a modified form of the governor shown in Figure 1; and Figure 7 is a sectional elevation of a simple form of governor, according to the invention, which is not adapted to control the idling of the engine.

Figures 1 to 5 of the drawings show at 11 part of a fuel pump unit of ordinary form, having a driving shaft 12 and a control rod 13 the remote end of which latter (shown in Figures 3 to 5) can coact with a main control shown as a lever 14 which can be connected to an accelerator pedal or the like, the rod 13 being slidable to the left against the ordinary form of pull-off spring (not shown) in the pump unit to increase the quantity of fuel delivered by the pumps per stroke, and vice versa, in a known manner.

The governor includes a hollow main spindle 16 mounted in a casing 17 in bearings 18 by which it is endwise held, and the spindle is adapted to be driven in any convenient manner at a speed dependent upon that of the engine crankshaft. It is shown as provided with chain teeth 19 or gear teeth 20 for driving purposes. Pivotally mounted at the flared end of the spindle 16 are a couple of diametrically-opposite bob weights 21 which are biased towards one another by means of a light governor spring 22. (The maximum and minimum speed positions of the bob weights are indicated by chain lines 23.) The bob weights are formed with fingers 24 engaged in a surface groove of an idling-control sleeve 25, which has a sliding and driving connection, indicated by longitudinal splines 26, with an internal timing-control sleeve 27. The latter also has a sliding and driving connection through splines 28 with the governor spindle 16, and at its other end it carries a circlip 29 which coacts with the idling-control sleeve 25 when the latter is moved to the left by the bob weights. The timing-control sleeve 27 is biased to the right by a light spring 30. Internally the timing-control sleeve 27 has a quick-screw-threaded engagement with the driving shaft 12 for the pump unit. The quick-screw-threaded connection is shown as taking the form of helical splines 33. The driving shaft 12 is endwise located in the governor spindle 16 by a thrust bearing 34.

In consequence, outward movement of the bob weights as the engine speed increases will draw the timing-control sleeve 27 to the left, and, the driving shaft 12 being axially fast, such movement will serve partially to rotate it relatively to the governor spindle 16 in order to advance the moment of fuel delivery—without, of course, altering the quantity of fuel delivered per stroke. The reverse movements take place under the action of the spring 30 when the engine speed decreases.

In the present instance the timing-control sleeve 27 is internally fitted with a thrust bearing 36 engaged by a rod 37. The latter passes through an adjustable bush 38 which carries a main governor spring 39. This only comes into action, it will be observed, when the bob weights are well opened out, i. e., beyond the idling position. The springs 30 and 39 can be adjusted by the bush 38.

The rod 37 may be connected with a manual control or with a thermostatic control for advancing the moment of injection when the engine is cold, such movement, of course, overriding the action of the governor. As previously stated, at starting the moment of injection can advantageously be advanced to a point such as that normally used with the engine warm when running at two-thirds up to normal full speed under the control of the governor. When the engine is warmed up, however, the rod 37 must be free of any manual or thermostatic control, so that the moment of injection will depend entirely upon the governor action.

Figure 2:
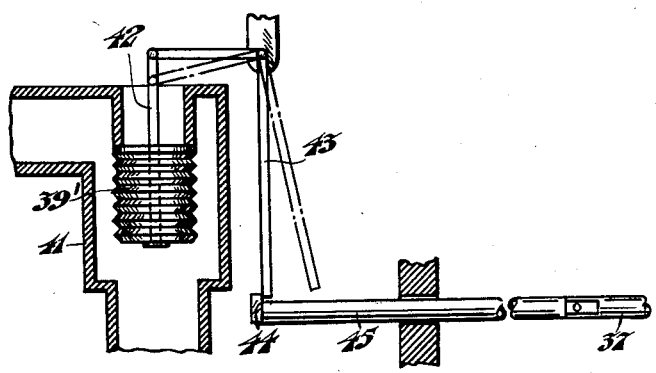
Figure 2 is a diagram indicating one way in which a thermostat may be associated therewith for automatically overriding the governor action when the engine is cold.

In the diagrammatic arrangement of Figure 2 the thermostat 39', shown as being of the bellows type and disposed in part of the cooling water system, indicated at 41, of the engine, is provided with a rod 42 hinged to a bell-crank lever 43 which coacts with a projection 44 on a slidable rod 45 fast with the rod 37. When the engine cools down the thermostat contracts, pushes up the rod 42, and turns the bell-crank lever 43 clockwise to the position shown in full lines, thereby moving the rod 37 to the left to advance the moment of injection as above-mentioned. (This condition is illustrated in Figure 3.) When the engine heats up to normal working temperatures the thermostat, in expanding, pulls down the rod 42 and turns the bell-crank lever 43 to the position shown in Figure 2 by chain lines, in which it is quite clear of the projection 44 on the rod 45, thereby leaving the rod 37 and the timing-control sleeve 27 free to be controlled by the bob weights.

Furthermore, in the present instance the control rod 13 is connected to a tube 47 in which is disposed a light spring 48 in compression acting on a plunger 49 retained in the tube by a circlip 51, the plunger being fast on a rod 52. This is connected in any convenient manner to be reciprocated responsively to the axial movements of the idling-control sleeve 25, as by engaging a peripheral groove 53 thereof through a lever 54. The object of the resilient connection 47—51 is to enable the control rod 13 to be worked by the accelerator pedal or the like in a normal manner, and the spring 48 is sufficiently light not to interfere with the proper operation of the governor in those conditions.

Thus, when starting up from cold, with the parts in the position of Figure 3, the moment of injection is advanced by the thermostat and the engine will idle under the control of the governor with the weights just floating. When the engine warms up and is still idling under the control of the governor, the parts are in the position shown by Figure 4, in which the moment of injection is now also under the control of the governor. When the main control 14 is well opened, to increase the engine speed, the parts are in the position shown by Figure 5, the governor now controlling only the moment of injection. The three governor springs 22, 30 and 39 provide a differential effect. On opening the main control 14 to increase the engine speed the main governor spring 39 is engaged after the bob weights have moved out a predetermined extent, thereafter giving a slower rate of advance. The first movement of the bob weights, corresponding to idling speeds of, say, between 400 and 600 revolutions per minute, is against the light springs 22 and 30 (the latter being involved only when the engine is warm), and the main movement of the bob weights—for example, over a speed range of between 1000 and 2000 revolutions per minute—is additionally against the main governor spring 39. The pull-off spring (not shown) for the fuel control rod 13 must exercise so light an effort that the idling control means can override it when the engine is idling.

Obviously, if desired, the light spring 30 may be omitted and the movement of the timing-control sleeve 27 to the right limited by a stop— for example, by the thrust bearing 34—such that when the timing-control sleeve is against the stop the thrust bearing 36 will engage the main governor spring 39, as is shown by Figure 6 hereof. In these conditions, as will be well understood, the circlip 29 will be disposed so as to be spaced from the adjacent end of the idling-control sleeve 25 to leave the later free to respond to the action of the bob weights under the bias of the light spring 22 when the engine is set for idling, without encountering any restraint from the main governor spring 39, whether the engine be hot or cold. Naturally, in this case the timing-control sleeve will not move, to govern the moment of injection, during idling of the engine, but will, of course, be operated at higher engine speeds when the engine is warm. Preferably in practice the circlip 29 is replaced by an adjustable abutment.

Obviously, too, if it be not desired to control the fuel supply of the engine when idling, the two sleeves 25 and 27 may be formed integrally— i. e., the bob weight fingers 24 may act directly on the timing-control sleeve 27. Such an arrangement is shown by Figure 7, where the reference numerals applied in Figures 1 to 5 are used as far as possible to denote similar parts. The thrust bearing 36, connected to the rod 37, is in this case carried by a cap 56 secured to the end of the timing-control sleeve 27, the latter being connected by straight splines 28 with the main governor spindle 16 and by helical splines 33 with the driving shaft 12 of the fuel pump unit. It is formed with a peripheral channel 57 directly engaged by the fingers 24 of the bob weights, and in this case these open against a single governor spring 58.

What I claim as my invention and desire to secure by Letters Patent of the United States is:

1. For a fuel-injection engine, the combination with a fuel pumping unit having a driving shaft, of a speed-responsive governor for controlling the moment of injection, and means for overriding the governor action, said governor including a main spindle driven at a speed responsive to that of the engine crankshaft, a timing-control member having a sliding and driving connection with said main spindle and having a quick-screw-threaded connection with said driving shaft, said main spindle and said driving shaft being endwise fixed whereby axial movement of said timing-control member will alter the angular relationship between said main spindle and said driving shaft, means biasing said timing-control member axially in one direction, bob weights carried by said main spindle and connected to actuate said timing-control member in the other direction under centrifugal action, and means for actuating said timing-control member in the said other direction when the engine is cold independently of the governor action and for releasing said member when the engine is warm.

2. For a fuel-injection engine, the combination with a fuel pumping unit having a driving shaft, of a speed-responsive governor for controlling the moment of injection, and means for overriding the governor action, said governor including a hollow main spindle driven at a speed responsive to that of the engine crankshaft, a timing-control sleeve having a sliding and driving connection with the interior of said main spindle, said timing-control sleeve surrounding and having a quick-screw-threaded connection with said driving shaft, said main spindle and said driving shaft being endwise fixed whereby axial movement of said timing-control sleeve will alter the angular relationship between said main spindle and said driving shaft, means biasing said timing-control sleeve axially in a direction to retard the moment of injection, means for actuating said timing-control sleeve in the other direction when the engine is cold and for releasing said sleeve when the engine is warm, and bob weights carried by said main spindle and connected to actuate said sleeve in the said other direction under centrifugal action.

3. For a fuel-injection engine, the combination with a fuel pumping unit having a driving shaft, of a speed-responsive governor for controlling the moment of injection, and automatic means for overriding the governor action, said governor including a main spindle driven at a speed responsive to that of the engine crankshaft, a timing-control member having a sliding and driving connection with said main spindle and having a quick-screw-threaded connection with said driving shaft, said main spindle and said driving shaft being endwise fixed whereby axial movement of said timing-control member will alter the angular relationship between said main spindle and said driving shaft, means biassing said timing-control member in one direction, spring-returned bob weights carried by said main spindle and connected to actuate said timing-control member in the other direction under centrifugal action, and means responsive to the engine temperature for actuating said timing-control member in the said other direction when the engine is cold independently of the governor action and for releasing said member when the engine is warm.

4. For a fuel-injection engine, the combination with a fuel pumping unit having a driving shaft and a fuel control rod, of a speed-responsive governor, means actuated by said governor for controlling the moment of injection, means independent of said governor for moving said last-named means out of the idling range of control of said governor, and means between said governor and control rod for regulating quantity supply of fuel to the engine when said second-named means is moved out of the idling range of said governor.

5. For a fuel-enjection engine, the combination with a fuel pumping unit having a driving shaft and a fuel control rod, of a speed-responsive governor for controlling the moment of injection and the idling of the engine, said governor including a main spindle driven at a speed responsive to that of the engine crankshaft, a timing-control member having a sliding and driving connection with said main spindle and having a quick-screw-threaded connection with said driving shaft, said main spindle and said driving shaft being endwise fixed whereby axial movement of said timing-control member will alter the angular relationship between said main spindle and said driving shaft, means biassing said timing-control member axially in one direction, an idling-control member having a sliding and driving connection with said timing-control member, spring-returned bob weights carried by said main spindle and connected to actuate said idling-control member, coacting means between said members such that said idling-control member can actuate said timing-control member in the other direction under the action of the bob weights, and means including an elastic lost motion connection whereby said idling-control member can actuate said fuel control rod under the action of the bob weights when the engine is set for idling.

6. For a fuel-injection engine, the combination with a fuel pumping unit having a driving shaft and a fuel control rod, of a speed-responsive governor associated with said driving shaft for controlling the moment of injection, means for overriding the governor action in its idling range when the engine is cold, and a connection between the governor and said fuel control rod, of such a nature that the governor will also control the quantity of injection in the idling range of the engine whether the latter be warm or cold.

7. For a fuel-injection engine, the combination with a fuel pumping unit having a driving shaft and a fuel control rod, of a speed-responsive governor for controlling the moment of injection and the idling of the engine, and means for overriding the governor action as regards controlling the moment of injection, said governor including a main spindle driven at a speed responsive to that of the engine crankshaft, a timing-control member having a sliding and driving connection with said main spindle and having a quick-screw-threaded connection with said driving shaft, said main spindle and said driving shaft being endwise fixed whereby axial movement of said timing-control member will alter the angular relationship between said main spindle and said driving shaft, means biassing said timing-control member in one direction, means for actuating said timing-control member in the other direction when the engine is cold independently of the governor action and for releasing said member when the engine is warm, an idling-control member having a sliding and driving connection with said timing-control member, spring-returned bob weights carried by said main spindle and connected to actuate said idling-control member, coacting means between said members such that said idling-control member can actuate said timing-control member in the said other direction under the action of the bob weights, and means including an elastic lost-motion connection whereby said idling-control member can actuate said fuel control rod under the action of the bob weights when the engine is set for idling.

8. For a fuel-injection engine, the combination with a fuel pumping unit having a driving shaft and a fuel control rod, of a speed-responsive governor for controlling the moment of injection and the idling of the engine, and means for overriding the governor action as regards controlling the moment of injection, said governor including a hollow main spindle driven at a speed responsive to that of the engine crankshaft, a timing-control sleeve having a sliding and driving connection with the interior of said main spindle and surrounding and having a quick-screw-threaded connection with said driving shaft, said main spindle and said driving shaft being endwise fixed whereby axial movement of said timing-control sleeve will alter the angular relationship between said main spindle and said driving shaft, means biassing said timing-control sleeve in one direction, means including a thermostat responsive to the engine temperature for actuating said timing-control sleeve in the other direction when the engine is cold independently of the governor action and for releasing said sleeve when the engine is warm, an idling-control sleeve surrounding and having a sliding and driving connection with said timing-control sleeve, spring-returned bob weights carried by said main spindle and connected to actuate said idling-control sleeve, co-acting means between said sleeves such that said idling-control sleeve can actuate said timing-control sleeve in the said other direction under the action of the bob weights, and means including an elastic lost-motion connection whereby said idling-control sleeve can actuate said fuel control rod under the action of the bob weights when the engine is set for idling.

ARTHUR FREEMAN SANDERS.